United States Patent [19]

Gutner

[11] 3,940,212

[45] Feb. 24, 1976

[54] FURNITURE BRACKET AND METHOD

[76] Inventor: Kenneth H. Gutner, 3285 Dato, Highland Park, Ill. 60035

[22] Filed: Apr. 2, 1975

[21] Appl. No.: 564,547

[52] U.S. Cl. .............. 403/405; 52/753 C; 312/108
[51] Int. Cl.² .......................................... F16B 12/00
[58] Field of Search ............ 312/108, 111; 403/405, 403/300; 52/753 L, 753 C, 754; 248/475 R, 476, 300

[56] References Cited
UNITED STATES PATENTS 1,765,614  6/1930  Roberts et al. .................... 52/753 C Primary Examiner—Andrew V. Kundrat
Attorney, Agent, or Firm—Dawson, Tilton, Fallon & Lungmus

[57] ABSTRACT

A furniture bracket and method of using the same wherein the bracket secures vertically related, wood framed furniture pieces and includes a unitary metal body having a plurality of openings extending there through and defined by generally frusto conical walls projecting a greater distance away from the body than a perimetric flange thereon to provide a bighting engagement with the frame while stabilizing the bracket securement.

3 Claims, 6 Drawing Figures

U.S. Patent  Feb. 24, 1976  3,940,212
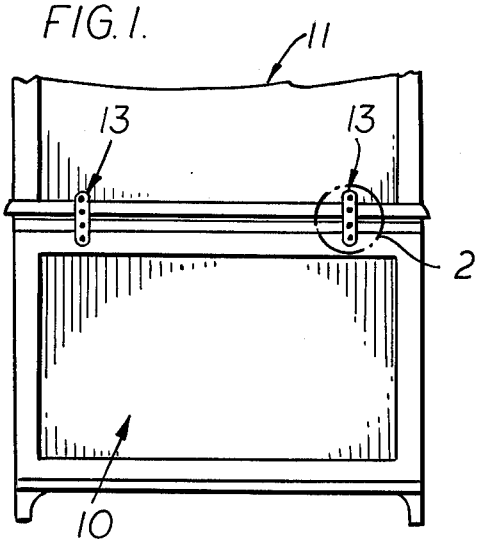
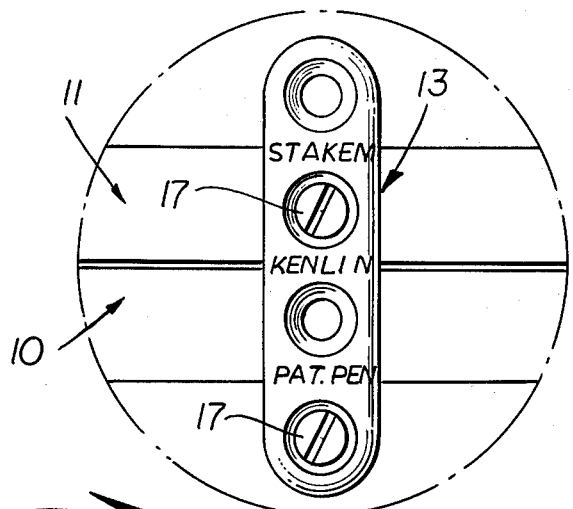
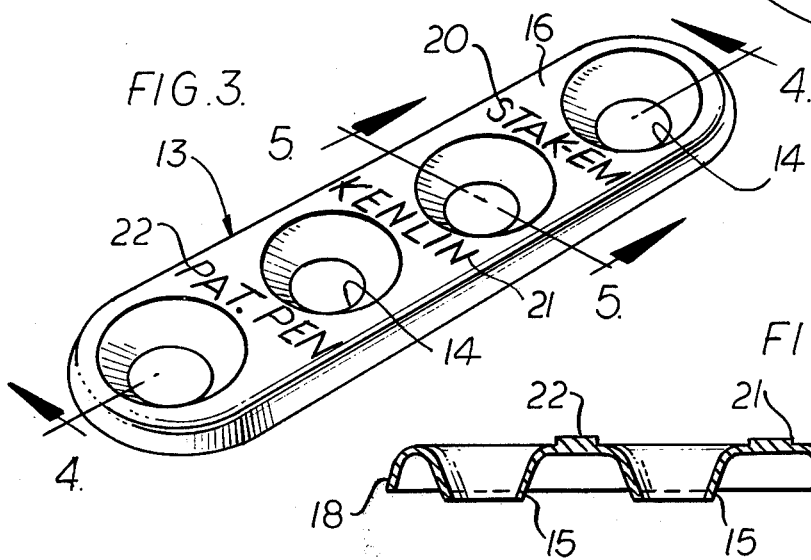
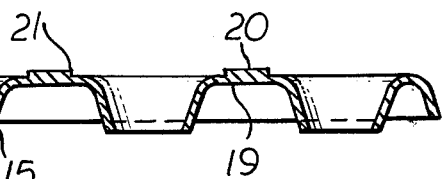
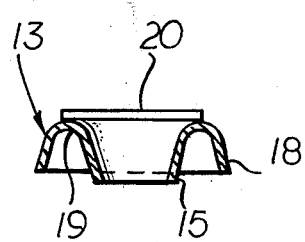
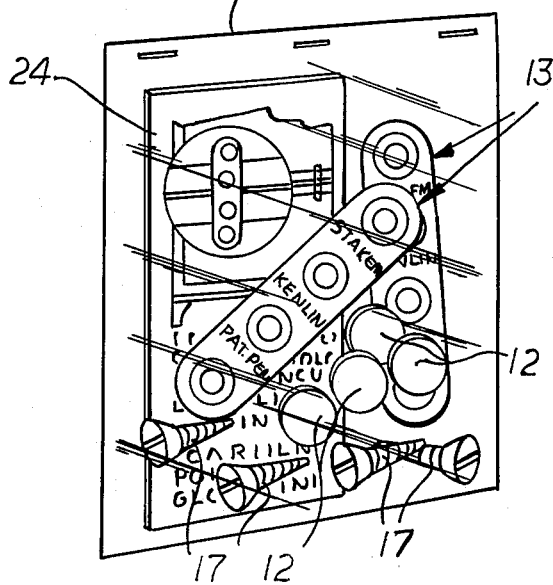

FURNITURE BRACKET AND METHOD

BACKGROUND AND SUMMARY OF INVENTION

This invention relates to a furniture bracket and method of using the same, and, more particularly, to a bracket intended to secure vertically related wood frames furniture pieces together. Illustrative of the type of furniture pieces are a buffet topped by a hutch. Inasmuch as the supported piece, i.e., the hutch, or other breakfront type of furniture, is relatively heavy, securement of the same to the supporting case is not required under completely static conditions. However, securement is most desirable because the supported piece may move or topple when the furniture is moved for cleaning or if someone falls against the supported piece, or even in the abnormal event of an earth tremor—with the possibility of serious injury or damage. Thus, the invention is directed to stabilizing the supported piece during every kind of contingency. Bearing in mind that the chances of this occurring may be slight, it will be appreciated that not much can be invested in the form of securing brackets. Yet, on the other hand, whatever the securing means is, it must be able to withstand the stresses referred to. In the past, furniture manufacturers have provided very simple and therefore cheap straps for this purpose but without much thought as to maximizing realiability and aesthetics while minimizing cost.

According to the invention, these seemingly conflicting goals have been realized. It should be pointed out that with an expensive piece of furniture such as a dining buffet and hutch, and even though the rear side is not seen often, when it is seen, whatever hardware is used should be pleasing in its functional aspect. To this end, I have developed a novel bracket which includes a unitary body which is relatively elongated and has a plurality of aligned, longitudinally spaced openings extending therethrough for receiving wood screws. The body on the face adjacent the furniture is equipped with a continuous perimetric flange extending toward the furniture and with a generally frustro conical projection or wall about each of the openings, each projection extending away from the confronting face a distance slightly greater than the distance the flange extends away from the confronting face. On the face of the body remote from the furniture, I provide integrally embossed means which serve a dual purpose in first rigidifying the bracket while at the same time serving as informational indicia as to the source of the bracket.

Other advantages and objects of the invention may be seen in the details of the construction and operation set down in the ensuing specification.

DETAILED DESCRIPTION

The invention is described in conjunction with an illustrative embodiment in the accompanying drawing, in which FIG. 1 is a fragmentary rear elevational view of furniture pieces connected according to the teachings of this invention;

FIG. 2 is an enlarged fragmentary view of the portion of FIG. 1 circled and having the numeral 2 applied thereto;

FIG. 3 is a perspective view of the furniture bracket constructed according to the teachings of this invention;

FIGS. 4 and 5 are sectional views taken along the lines 4—4 and 5—5, respectively, as applied to FIG. 3; and FIG. 6 is a perspective view of a package containing the bracket and associated elements provided by the manufacturer and to be used by the purchaser at the time of assembly.

In the illustration given and with reference first to FIG. 1, the numeral 10 designates generally a first or lower furniture piece which may be a buffet or case. In FIG. 1, the view is from the rear side of the furniture piece.

The numeral 11 designates generally a second or upper furniture piece which can be a hutch or breakfront supported on the lower piece 10. I find it advantageous to provide felt pads at the four corners of the upper unit 11 such as the elements designated 12 in FIG. 6 and which will be described in greater detail hereinafter.

To prevent inadvertent movement of the upper piece 11 relative to the lower piece 10, I provide a pair of brackets generally designated 13, and which can be seen in greater detail in FIGS. 2–5.

Referring first to FIG. 3, the bracket 13 is seen to include a generally rectangular or elongated unitary metal body. The body is advantageously made of steel plate having a thickness of the order of about 0.030 to about 0.036 inch. The plate 13 as can be readily appreciated from a consideration of FIG. 3 is equipped with four openings 14 which are aligned and longitudinally spaced apart. Each opening extends through the thickness of the plate and each opening is defined in part by a frusto conical projection 15 (see FIGS. 4 and 5). Inasmuch as the projections 15 have been developed in a unitary body as by stamping, the surface 16 (the upper surface is viewed in FIG. 3) is characterized by a generally frustro conical recess about each opening 14. It will be appreciated that the surface 16 becomes the outer face of the bracket when the same is installed as seen in FIG. 1. For that purpose a pair of wood screws 17 are provided for each bracket (compare FIG. 6) which extend through the bracket and are threadably received within the wood frames of the upper and lower pieces 11 and 10, respectively. I prefer to install the wood screws 17 in the lowermost opening in the bracket for receipt into the lower piece 10 so as to avoid any "chip-core" construction that may be used for the top surface of the lower furniture piece 10. However, depending upon the height of the frame associated with each of the pieces, wood screws may be inserted into various of the four openings 14 that are provided.

Referring again to FIGS. 4 and 5, it will be seen that the bracket 13 is equipped with a perimetric flange 18. Further, it will also be noted from a consideration of FIGS. 4 and 5 that the frusto conical projections 15 extend further away from the inner wall 19 than does the flange 18. In the illustration given, the difference in extension is exaggerated. In normal practice, the frusto conical projections extend away from the inner surface a distance of from about 0.002 to about 0.025 further than does the flange 18. This permits the initial engagement of the bracket with the furniture piece to be achieved through the projections 15—causing them to bightingly engage the wooden frames and provide a secure anchor or seat. Thereafter, as the wood screws 17 are tightened (and here it will be appreciated that the frusto conical recesses around the openings 14 permit the wood screws to be countersunk), the perimetric flange 18 comes into contact with the frames of the furniture pieces 10 and 11 thereby providing an additional stabilization and stiffness for the connection between the two pieces.

In the preferred form of the invention, I provide advantageous rigidification or stiffening of the brackets 13 by means of upstanding embossments in the outer surface 16. These can be quickly appreciated from a consideration of FIG. 3 where the indicia "STAK-EM" designated 20, "KENLIN" designated 21 and "PAT. PEN." designated 22 are seen. Thus, I simultaneously provide a reinforcing rib means and informational indicia. This again permits the use of lighter gauge material yet yields advantageous stiffness and rigidity for the installed bracket.

In the operation of the invention, a package 23 (see FIG. 6) is provided that is preferably a polyethylene bag. Provided within the sealed bag as at 24 is an instruction placard (alternatively printed on the bag itself), two brackets 13, four wood screws 17, and four felt pads 12. Such a package is conveniently provided by the furniture manufacturer and is normally sent along with the upper unit 11. When the upper unit 11 is received by the purchaser, the package is opened and the four felt pads removed. These are constructed fo felt having a pressure sensitive adhesive on one surface initially covered by a release backing. The release backing is peeled off and the pads are placed at the corners of the upper or lower unit, as desired. Thereafter, each of the brackets 13 is installed and the center indicia 21 can be advantageously used as a guide by having this indicia even with the bottom of the upper unit 11. Thereafter, each bracket 13 is attached to the upper and lower units through the use of the wood screws 17. Through the foregoing structure and operation, an exceedingly reliable connection is made between vertically related furniture pieces. Moreover, the installation is simple, the hardware and associated parts providing the connection are relatively inexpensive yet artistic in appearance.

The bracket 13 is enhanced both functionally and aesthetically by its obround character when viewed in elevation—see FIG. 2. By obround, I refer to the fact that the ends are essentially semicircular but spaced apart and connected by straight lines. This results in the perimetric flange 18 being spaced generally equally from adjacent of each of the projections 15 — both at the sides and ends of the body.

I Claim:

1. A bracket for securing vertically related, wood framed furniture pieces together comprising a generally rectangular, unitary metal body having length, width, and thickness dimensions with said length and width dimensions defining outer and inner faces, a plurality of aligned, longitudinally spaced openings extending through said thickness for receiving wood screws, said body on said inner face being equipped with a continuous perimetric flange extending generally perpendicularly away from said inner face, said inner face also being equipped with a generally frusto conical projection about each of said openings, each projection extending away from said inner face a distance from about 0.002 to about 0.025 inch further than said flange whereby said projections are adapted to bightingly engage said wood frames prior to engagement of said flange with said frames, said projections providing generally frusto conical recesses in said top surface to permit countersinking said wood screws.

2. The structure of claim 1 in which said perimeter is generally obround whereby said flange is spaced generally equally from adjacent of said openings at the ends and sides of said body.

3. The structure of claim 1 in which said upper surface is equipped with integral, upstanding rib means between adjacent openings, said rib means being contoured as informational indicia.

* * * * *